Feb. 23, 1932.  J. R. AYOTTE  1,846,781
ELECTRIC CIGAR LIGHTER
Filed July 23, 1928
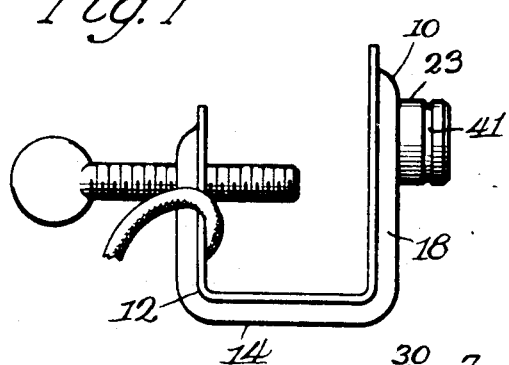
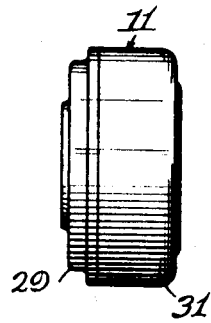
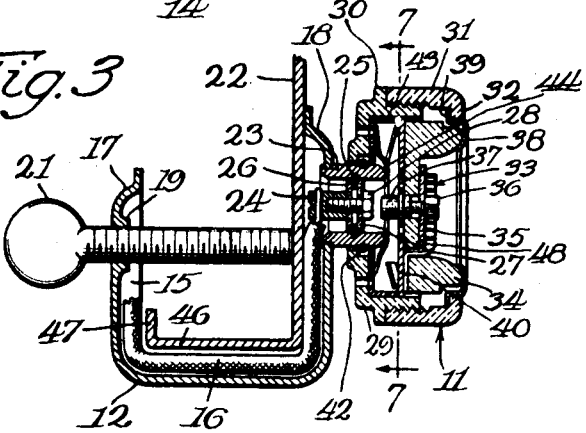
Inventor
Joseph Rene Ayotte Patented Feb. 23, 1932

1,846,781

UNITED STATES PATENT OFFICE

JOSEPH RENÉ AYOTTE, OF CHICAGO, ILLINOIS, ASSIGNOR TO THE NORLIPP COMPANY, OF CHICAGO, ILLINOIS, A CORPORATION OF ILLINOIS

ELECTRIC CIGAR LIGHTER

Application filed July 23, 1928. Serial No. 294,717.

This invention relates to cigar lighters and more particularly to the type adapted to be attached to automobiles and the like.

One of the objects of the invention is the provision of a new and improved lighter with new and improved means for assembling the parts.

Another object of the invention is the provision of a new lighter head with new and improved means for preventing the same from becoming overheated.

A further object of the invention is the provision of a new and improved bracket or attaching member for attaching the device to the dash or instrument board of an automobile.

A still further object of the invention is the provision of a cigar lighter and support that are so constructed and arranged as to constitute an attachment that may be readily attached to or detached from the conventional automobile.

Another object of the invention is the provision of a new and improved cigar lighter attachment device that is cheap to manufacture, light in weight, easily assembled, readily attached to an automobile, efficient in operation, neat and attractive in appearance, and that is not likely to become broken or get out of order.

Other and further objects and advantages of the invention will appear from the following description taken in connection with the accompanying drawings in which Fig. 1 is a side view of the bracket or supporting member;

Fig. 2 is a side elevation of the lighting head;

Fig. 3 is a longitudinal vertical section of the supporting member and head in assembled relation, and in position as clamped to an instrument board;

Fig. 4 is a front elevation of the lighting head;

Fig. 5 is a front elevation of the supporting member with the head removed;

Fig. 6 is a rear elevation of the lighting head;

Fig. 7 is a section substantially on line 7—7 of Fig. 3; and

Fig. 8 is a vertical section of the attaching ring.

Referring now to the drawings, the reference character 10 designates a support for what for convenience will be termed the lighter head 11.

The support 10 comprises a U-shaped bracket 12 which may be stamped from sheet metal. The bracket 12 is provided with a depression 14 extending longitudinally thereof in the median plane. This depression forms a strengthening rib or bead and also forms a groove 15 for receiving and protecting an electrical conductor 16, as will presently appear. The ends of the depression or groove 15 are enlarged as at 17 and 18. The enlarged portion 17 is provided with an annular boss 19 having a threaded opening extending axially therethrough. A clamping screw 21 extends through said opening and is adapted to clamp the bracket to the dash or instrument board 22 of an automobile.

Suitable means are provided for supporting the head 11 from the bracket. As shown, a hollow sleeve or neck member 23 is provided for this purpose. The sleeve is rigidly attached to the enlarged depressed portion 18 as by having its reduced end extending through an opening in the bracket and then upset as clearly shown in Fig. 3.

The conductor 16 is attached to a terminal 24 which in turn is supported within but insulated from the neck or sleeve 23 in any suitable manner. In the form of construction shown, the inner periphery of the sleeve 23 is provided with an annular recess in which is seated a resilient attaching ring 25 clamped between two discs 26 and 27 of suitable insulating material by a screw 28 which engages a threaded opening in the terminal 24 and forms a continuation of said terminal. The ring 25 is normally concave as shown in Fig. 8 and its diameter is such that the disk can be placed in position in the sleeve and when clamped in position it is caused to expand into the groove by being flattened, thereby holding the parts assembled.

The lighting head 11 comprises an inner or base member 29 and an outer member 31 both of which may be of suitable insulating material although the base member may be of metal, if desired.

The base member 29 is preferably cup-shaped with an axial opening through its bottom wall. The outer member 31 is preferably annular and has an annular flange 32 extending axially inwardly from its forward portion. The two members are adapted to be connected together in any convenient manner. As shown, the outer end of the member 29 is screw threaded for engaging corresponding threads on the inner periphery of the inner end of the member 31. A flange 30 limits the relative movement of the members 29 and 31 when they are connected.

Mounted within the lighting head is a lighting element 33 comprising a cup-shaped member of insulating material 34, to the bottom wall of which is attached a coil of high resistance material 35 one end of which is secured in the end of a screw 36 which is attached to a terminal plug 37 secured in the bottom wall of the cup shaped member 34 and extending inwardly axially thereof. The terminal plug 37 is adapted to be brought in contact with the terminal 24 for heating the element 35 as will presently appear.

The member 34 is held in position by a finishing ring 38 which may be of metal and has an annular flange engaging the outer edge of the member 34 and a radially extending flange 39 for engaging beneath the flange 32 of the head member 31.

Suitable means are provided for detachably connecting the lighting head to the neck or sleeve 23. As shown, the sleeve 23 is provided with a groove 41 which is adapted to be engaged by a resilient split ring 42 which is secured in the bottom wall of the lighting head in a manner that will now be described. The bottom wall of the head member 29 is provided with a countersink for receiving the ring as clearly shown in Fig. 3 and the ring is held in position by a sheet metal cup 43. The cup 43 is held against the bottom wall of the member 29 by the resilient member 44. The member 44 is in the form of a sheet metal disk having resilient tongues 45 on its periphery which are bent laterally therefrom. The resilient member 44 is contained within the sheet metal cup 43 and is held in position therein by a disk or washer 40 that is interposed between said spring and the element 34.

When the parts are assembled the spring member 44 is under tension and its central portion engages the outer end of the sleeve or neck 23 whereby the resiliency of the member 44 will normally hold the terminals 24 and 37 out of contact. These terminals may be brought into contact by pressing inward on the lighting head against the compression of the spring member 44, thereby completing the circuit through the conductor 16, the terminals 24, 37 and the heating or lighting element 35. The outer end of the lighting element 35 is brought into contact with the disk or washer 40 whereby the current is grounded on the automobile through the washer 40, the cup shaped member 43, the spring member 44, the neck or sleeve 23 and the bracket 12.

Suitable means are provided for cooling or preventing overheating of the inner portion of the head. A disk 48 of mica is interposed between the resistance element 35 and the cup-shaped member 34 of insulating material and the inner wall of the head 11 is provided with a plurality of perforations 49 which are adapted to register with corresponding openings in the bottom wall of the sheet metal cup 43. Air is free to circulate through these openings into and out of said cup for cooling this portion of the head.

In attaching the support or bracket 10 to the dash or instrument board 22 of a boat, automobile or other vehicle or support, the conductor 16 is placed within the depression, the bracket is placed in position as shown in Fig. 3 and the screw 21 is then run up to clamp the board 22. The bead formed by the depression 15 constitutes a reinforcement for the bracket whereby the bracket may be made from sheet metal of light gauge. This is an important feature of the invention because the conductor is adequately protected and the bracket being stamped from sheet metal of light gauge may be manufactured at a very low cost.

The instrument board 22 of boats and automobiles is usually provided with a flange 46 having a narrow return bent portion 47. The groove or depression 15 extends upward beyond the edge of the return bent portion 47 for permitting the conductor to emerge from the groove above the portion 47.

In the operation of the device, when it is desired to light a cigar or cigarette the head 11 is pushed inward on the sleeve 23 against the resistance of the spring 44 until the terminal 37 contacts the terminal 24 or rather the head of the screw 28 and is held in that position until the coil 35 becomes incandescent, which it will do in a very few seconds due to the large amperage flowing through said coil. The head is then removed by pulling the same outwardly longitudinally of said neck or sleeve with sufficient force to disengage the ring 42 from the groove 41. The head may then be used for lighting the cigar or cigarette by bringing the heated coil 35 into contact with the end of the same in the usual manner.

It is thought from the foregoing taken in connection with the accompanying drawings that the construction and operation of my device will be apparent to those skilled in the art, and that various changes in size, shape, proportion and details of construction may be made without departing from the spirit and scope of the appended claims.

I claim as my invention:

1. In a cigar and cigarette lighter, a U-shaped supporting bracket having a narrow depression extending longitudinally thereof in its inner surface, forming a reinforcing rib on the outer surface of said bracket, said depression being adapted to receive an electrical conductor, and a clamping screw engaging one of the arms of said U-shaped bracket.

2. In a cigar and cigarette lighter, a U-shaped supporting bracket having a reinforcing bead on its outer surface extending longitudinally thereof, said bead forming a groove on the inner surface of said bracket, a conductor in said groove, a hollow supporting sleeve on one arm, a terminal for said conductor within said sleeve, and means for insulating said terminal from said sleeve.

3. In a cigar and cigarette lighter, an attaching bracket, a hollow supporting sleeve secured to said bracket and having an annular groove in its inner peripheral surface, an electrical terminal and means for supporting the same within said sleeve, said means comprising a normally concave disk of less diameter than the inner diameter of said sleeve, a disk of insulating material on each side of said first named disk, and means engaging said terminal for clamping said disks together for expanding said first named disk into said groove for holding said terminal within said sleeve out of contact therewith.

4. In a cigar and cigarette lighter, a lighter head comprising an inner and an outer member, means for detachably connecting said members together, said members forming an open-ended recess, a conductor member in said recess, the bottom wall of said inner member and said conductor member being provided with alined openings for receiving a supporting element, a lighting element, means for supporting said lighting element within said recess, a disk having laterally extending spring arms between said conductor member and lighting element, said disk being adapted to engage the outer end of said supporting element, a terminal secured to one end of said lighting element, and means for grounding the opposite end of said lighting element on said disk.

5. In a cigar and cigarette lighter, a lighter head comprising inner and outer members, said inner member being cup-shaped and said outer member being annular with an annular flange extending radially inwardly from its outer end, means for detachably connecting said members together, a lighting element, an insulating member for receiving said element, a finishing ring for engaging said flange and the outer portion of said insulating member, a spring member for resiliently holding said insulating member against said finishing ring, a terminal, means for connecting one end of said lighting element to said terminal, and means for connecting the opposite end of said lighting element to said spring member.

6. In a cigar lighter, a head comprising a base member having an axial opening therethrough and provided with a reduced end, said reduced end being screw-threaded, a cap member threaded on said reduced end and provided with an enlarged central opening, a resistance element opposite said opening within said casing, and having one end secured to a terminal extending longitudinally of the axis of said head and having its other end grounded on said head, a supporting member having a neck portion for engaging said axial opening, yieldable means for holding said head in neutral position on said neck portion, but yielding to pressure to permit said head to be removed from said neck portion or to be moved inwardly along the same, an electric terminal within said neck portion and insulated therefrom, and a disc within and carried by said head, said disc having laterally extending spring arms for resisting the inward movement of said head beyond said neutral position but yielding to permit contact of said terminals.

7. A cigar lighter comprising, a tubular base provided circumferentially with a groove, a contact terminal supported in and extending axially of said base, and a lighter head removably supported on said base, said head including, an inner cup-shaped member provided with a counterbore, said counterbore having an opening therein for receiving said base, an annular cap member having screw-threaded connection with the outer end of said cup member, a lighting element, an element-carrying member interposed between said cup and cap members and provided with a contact terminal positioned in alignment with said terminal in the base, a split ring in said counterbore for engaging said groove in the base to removably support the head on the base, a liner in said cup member for holding said ring in the counterbore, and yielding means interposed between said liner and said element-carrying member, said means comprising a disc provided with laterally extending arms for normally holding said terminals in separated open circuit position, said arms yielding under pressure on the head to permit contact between said terminals to complete a circuit through the lighting element.

In testimony whereof I affix my signature.

JOSEPH RENÉ AYOTTE.